US009827907B2

(12) United States Patent
Sugita et al.

(10) Patent No.: US 9,827,907 B2
(45) Date of Patent: Nov. 28, 2017

(54) DRIVE ASSIST DEVICE

(71) Applicant: CLARION CO., LTD., Saitama (JP)

(72) Inventors: Muneki Sugita, Saitama (JP);
Keiichiro Yoshihara, Saitama (JP);
Takaaki Ishii, Tokyo (JP); Yo Miyamoto, Tokyo (JP); Shohei Yamagata, Tokyo (JP)

(73) Assignee: CLARION CO., LTD., Saitama-shi, Saitama (JP)

( * ) Notice: Subject to any disclaimer, the term of this patent is extended or adjusted under 35 U.S.C. 154(b) by 0 days.

(21) Appl. No.: 14/890,751

(22) PCT Filed: Feb. 17, 2014

(86) PCT No.: PCT/JP2014/053632
§ 371 (c)(1),
(2) Date: Nov. 12, 2015

(87) PCT Pub. No.: WO2015/001815
PCT Pub. Date: Jan. 8, 2015

(65) Prior Publication Data
US 2016/0129836 A1 May 12, 2016

(30) Foreign Application Priority Data
Jul. 5, 2013 (JP) ................................. 2013-141927

(51) Int. Cl.
*B60R 1/00* (2006.01)
*B60K 35/00* (2006.01)
(Continued)

(52) U.S. Cl.
CPC ................ *B60R 1/00* (2013.01); *B60K 35/00* (2013.01); *B62D 15/021* (2013.01);
(Continued)

(58) Field of Classification Search
None
See application file for complete search history.

(56) References Cited

U.S. PATENT DOCUMENTS 6,735,517 B2 * 5/2004 Engelsberg .......... G01C 21/365
701/431
2003/0080877 A1 * 5/2003 Takagi ...................... B60R 1/00
340/932.2
(Continued)

FOREIGN PATENT DOCUMENTS

CN 104228583 A 12/2014
JP 08-178679 A 7/1996
(Continued)

OTHER PUBLICATIONS

Notice of Reasons for Refusal mailed by Japan Patent Office dated Jul. 26, 2016 in the corresponding Japanese patent application No. 2015-525064.
(Continued)

*Primary Examiner* — Ryan Rink
(74) *Attorney, Agent, or Firm* — IP Business Solutions, LLC

(57) ABSTRACT

Display of a drive assist by a virtual image is understandably presented to a driver. A drive assist device 1, which displays a virtual image 35 including a vehicle mark 76 on a vehicle 2 and assists driving by moving the vehicle mark 76, is configured to be provided with a relative-value converting unit 62 which converts a recommended driving operation to be shown to a driver 3 to a relative value based on a driving operation of present time; wherein the vehicle mark 76 is moved by a movement amount corresponding to the relative value to notify the driver 3 of the recommended driving operation.

9 Claims, 10 Drawing Sheets

(51) Int. Cl.
  *G08G 1/16* (2006.01)
  *B62D 15/02* (2006.01)
(52) U.S. Cl.
  CPC ......... *B62D 15/0295* (2013.01); *G08G 1/163* (2013.01); *G08G 1/166* (2013.01); *B60R 2300/205* (2013.01); *B60R 2300/80* (2013.01); *B60R 2300/8086* (2013.01)

(56) References Cited

U.S. PATENT DOCUMENTS

| | | | |
|---|---|---|---|
| 2005/0154505 A1 | 7/2005 | Nakamura et al. | |
| 2005/0264432 A1* | 12/2005 | Tanaka | B60Q 9/004 340/932.2 |
| 2006/0022810 A1* | 2/2006 | Inoue | B60Q 1/484 340/435 |
| 2006/0287826 A1* | 12/2006 | Shimizu | B60K 35/00 701/431 |
| 2007/0273544 A1* | 11/2007 | Astruc | G01C 23/005 340/670 |
| 2007/0279317 A1* | 12/2007 | Matsumoto | B60K 35/00 345/7 |
| 2008/0312792 A1* | 12/2008 | Dechamp | B62D 13/06 701/41 |
| 2010/0253594 A1* | 10/2010 | Szczerba | G01S 13/723 345/7 |
| 2011/0133916 A1* | 6/2011 | Suzuki | B60K 35/00 340/435 |
| 2011/0257828 A1* | 10/2011 | Levy | B60K 35/00 701/31.4 |
| 2012/0249589 A1* | 10/2012 | Gassner | G02B 27/01 345/633 |
| 2012/0268351 A1 | 10/2012 | Sasaki et al. | |
| 2012/0314074 A1* | 12/2012 | Aimura | G06K 9/00362 348/148 |
| 2013/0142385 A1* | 6/2013 | Mathieu | G01C 21/365 382/103 |
| 2013/0151145 A1* | 6/2013 | Ishikawa | G01C 21/3667 701/428 |
| 2013/0158851 A1* | 6/2013 | Herrmann | G06F 17/00 701/300 |
| 2014/0267263 A1* | 9/2014 | Beckwith | G06T 15/08 345/424 |
| 2014/0268353 A1* | 9/2014 | Fujimura | G02B 27/0101 359/630 |
| 2014/0371988 A1* | 12/2014 | Muramatsu | B60W 40/105 701/41 |
| 2015/0002285 A1 | 1/2015 | Hatakeyama | |
| 2015/0262484 A1* | 9/2015 | Victor | G09B 19/16 701/1 |
| 2015/0356872 A1* | 12/2015 | Atsmon | G08G 1/0112 701/522 |
| 2015/0367731 A1* | 12/2015 | Amano | B60K 35/00 701/36 |
| 2016/0054563 A9* | 2/2016 | Fujimura | G02B 27/0101 359/630 |
| 2016/0084661 A1* | 3/2016 | Gautama | G01C 21/365 701/400 |
| 2016/0086305 A1* | 3/2016 | Watanabe | B60K 35/00 345/672 |
| 2016/0094807 A1* | 3/2016 | Fujio | H04N 7/183 348/148 |

FOREIGN PATENT DOCUMENTS

| | | |
|---|---|---|
| JP | 2007-198746 A | 8/2007 |
| JP | 2007-272350 A | 10/2007 |
| JP | 2008-015758 A | 1/2008 |
| JP | 2008-129718 A | 6/2008 |
| WO | 2006/136664 A1 | 12/2006 |
| WO | 2013088535 A1 | 6/2013 |

OTHER PUBLICATIONS

International Search Report issued for corresponding PCT/JP2014/053632 application.
Written Opinion of the International Search Authority issued for corresponding PCT/JP2014/053632 application.
International Preliminary Report on Patentability issued for corresponding PCT/JP2014/053632 application.
Extended European Search Report mailed by European Patent Office dated Apr. 13, 2017 in the corresponding European patent application No. 14820509.9.
Notice of Reasons for Refusal mailed by Chinese Patent Office on Mar. 2, 2017 in the corresponding Chinese patent application No. 201480035214.0.

\* cited by examiner

DRIVE ASSIST DEVICE

TECHNICAL FIELD

The present invention relates to a drive assist device.

BACKGROUND ART

Japanese Patent Application Laid-Open No. 2008-129718 (Patent Document 1) describes "a drive assist device 1 provided with a vicinity-information acquiring means 10 that acquires vicinity information of a subject vehicle; a travel-assist-information calculating means 20 that calculates a moving speed of the subject vehicle in a direction to avoid a risk if it is determined that the risk is present for the subject vehicle based on information acquired by the vicinity information acquired by the vicinity-information acquiring means; and a display means 30 that displays a simulated vehicle moving in the direction to avoid the risk at the moving speed calculated by the travel-assist-information calculating means."

PRIOR ART DOCUMENT

Patent Document

Patent Document 1: Japanese Patent Application Laid-Open No. 2008-129718

SUMMARY OF INVENTION

Technical Problem

However, Patent Document 1 has space for improvement about the point to facilitate understanding of presentation of the information about drive assistance.

The present invention has been accomplished in view of the above described circumstances, and it is an object to provide a drive assist device capable of understandably presenting drive assistance.

Solution to Problem

This description includes all the contents of Japanese Patent Application No. 2008-255462 filed on Jul. 5, 2013.

In order to achieve the above described object, the present invention is a drive assist device that displays a virtual image of a predetermined mark at a vehicle and supports driving by moving the predetermined mark, the drive assist device provided with a relative-value converting unit that converts a driving operation to be indicated to a driver into a relative value based on a driving operation of present time; wherein the predetermined mark is moved by a movement amount depending on the relative value to notify the driver of the driving operation.

Advantageous Effects of the Invention

According to the present invention, drive assistance is understandably presented.

DESCRIPTION OF EMBODIMENT

Hereinafter, an embodiment of the present invention will be explained with reference to drawings.

Figure 1:
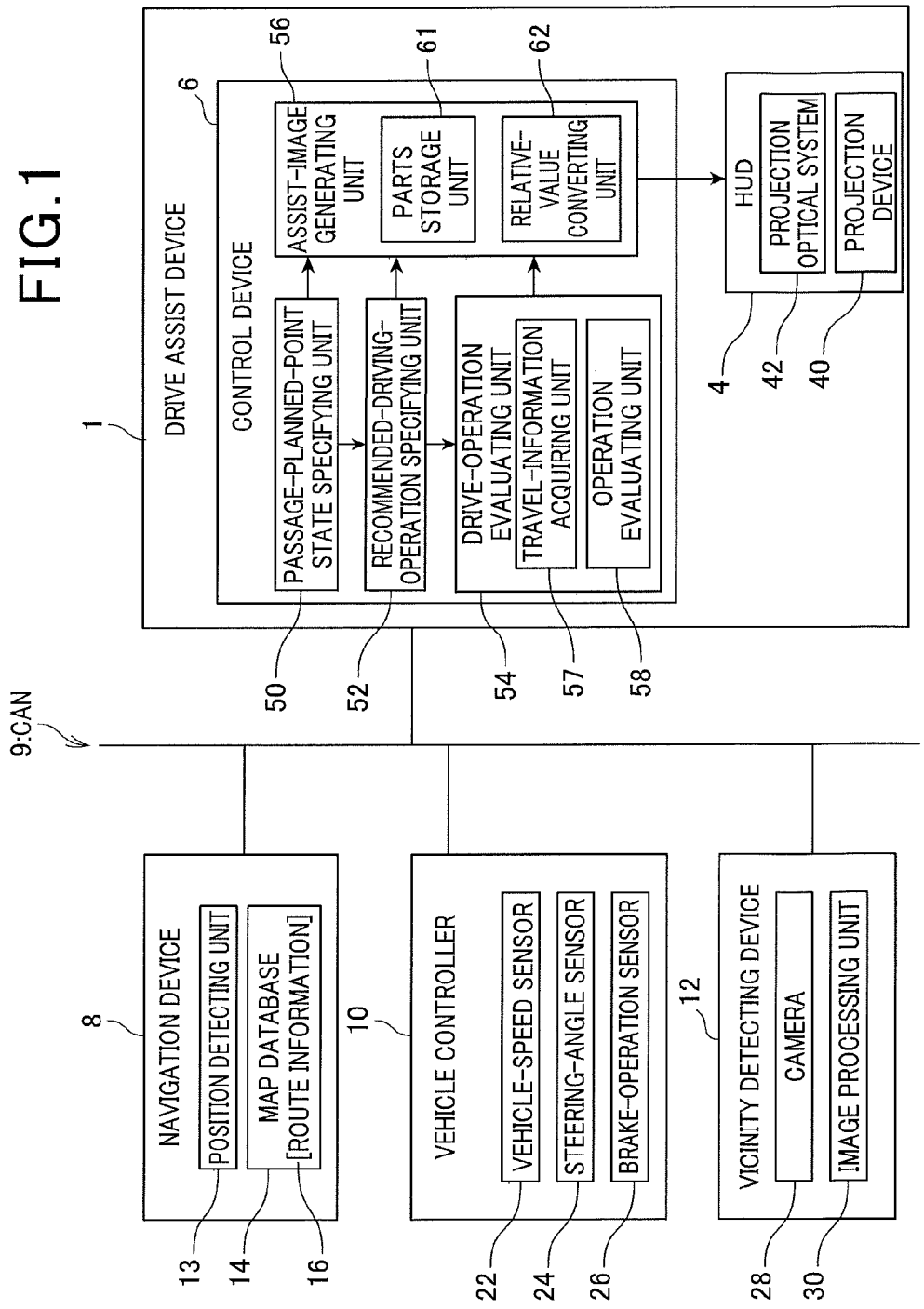
FIG. 1 is a drawing showing a functional configuration of a vehicle provided with a drive assist device according to an embodiment of the present invention.
Figure 2:
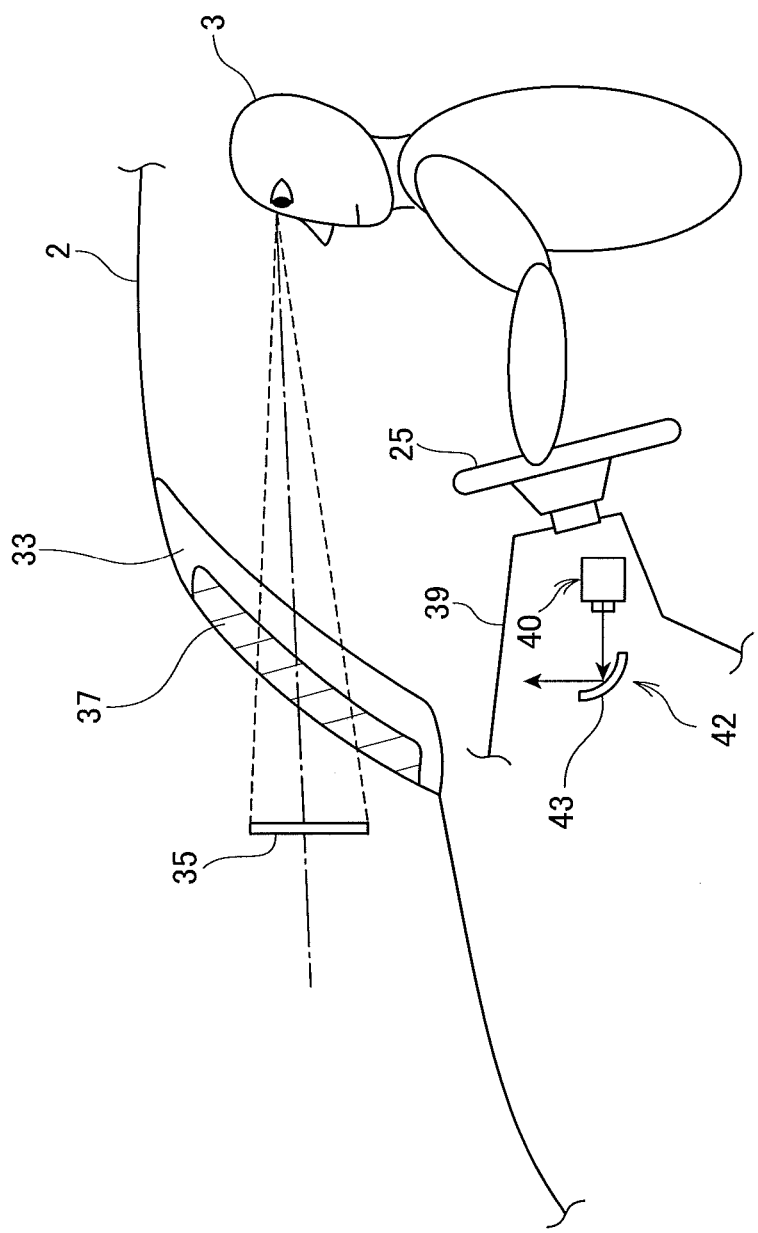
FIG. 2 is a drawing schematically showing a mode of installation of the drive assist device.

FIG. 1 is a drawing showing a functional configuration of a drive assist device 1 according to the embodiment, and FIG. 2 is a drawing schematically showing a mode of installation of the drive assist device 1.

As shown in FIG. 2, the drive assist device 1 assists driving operations of a driver 3 who drives a vehicle 2 and is configured as a vehicle-mounted device, which is mounted on the vehicle 2. As shown in FIG. 1, other than the drive assist device 1, the vehicle 2 is provided with a navigation device 8, a vehicle controller 10 and a vicinity detecting device 12, and these, including the drive assist device 1, are connected by a CAN (Controller Area Network) 9 and mutually transmit/receive information. Note that, instead of the CAN 9, an arbitrary communication line such as another on-vehicle LAN can be also used.

The navigation device 8 is a device which displays a travelling route(s) of the vehicle by an unshown display device to give a route guide and is provided with a position detecting unit 13 and a map database 14. The position detecting unit 13 detects the position of the subject vehicle at present time (current position) and is provided with a positioning function such as a GPS (Global Positioning System). The map database 14 stores map data including route information 16 with which the vehicle 2 can travel. The route information 16 includes road structure data. The road structure data is a group of information specifying structural elements of a road 60 (FIG. 3) and is data including road shapes such as road centerlines (curvature radius) and gradients, lane information such as roadway and compartment lines, and road facility information such as distance marks. Moreover, the route information 16 includes a legal speed of the road 60, various regulation information, etc.

The vehicle controller 10 detects travel information which is the information about travelling of the vehicle 2. In this drive assist device 1, at least the vehicle-speed information, steering angle and brake-operation information of the vehicle 2 are included in the travel information. Therefore, the vehicle controller 10 has a vehicle-speed sensor 22, a steering-angle sensor 24, and a brake-operation sensor 26. The vehicle-speed sensor 22 measures the rotation number of a wheel or the rotation number of an output side of a transmission, thereby detecting the vehicle speed of the vehicle 2. The steering-angle sensor 24 detects the steering angle of a steering wheel 25 (FIG. 2) attached to the vehicle 2, and the brake-operation sensor 26 detects the presence/absence of brake operations based on the operation degree of a brake pedal. Note that the travel information can include arbitrary information other than them, and in order to detect the information, the vehicle controller 10 can be provided with an appropriate sensor(s).

The vicinity detecting device 12 is a device which detects an object(s) present in the vicinity of the subject vehicle and particularly detects the positional relation between the object(s) present in a travelling-direction front side and the subject vehicle. In the drive assist device 1, the vicinity detecting device 12 is provided with a camera 28 and an image processing unit 30.

The camera 28 is an image-taking device such as a small CCD which sequentially takes images in the vicinity including at least the travelling-direction front side of the vehicle 2.

The image processing unit 30 subjects the taken images, which have been taken by the camera 28, to image recognition processing and detects the presence/absence of a predetermined target object(s). Examples of the predetermined objects include objects such as another preceding vehicle travelling in the travelling-direction front side, on-road installed objects and on-road obstacles. Furthermore, if the target object is detected, the image processing unit 30 obtains the size of the target object and the distance and direction from the subject vehicle to the target object and calculates the positional relation between the subject vehicle and the target object and the changed amount thereof by image processing of the taken images.

Note that the vicinity detecting device 12 may be provided with, for example, a radar distance measuring device, which detects the presence, distance, etc. of the above described object, instead of the above described camera 28 and the image processing unit 30 or in order to interpolate the results of recognition by the image processing unit 30.

The drive assist device 1 supports driving by presenting to the driver 3 with a driving operation (hereinafter, referred to as "recommended driving operation"), which is recommended in a case of travelling on a point (hereinafter, referred to as "passage-planned point") Pt (FIG. 3) on a route in the travelling-direction front side of the subject vehicle, in other words, a point on a route through which the subject vehicle may pass, and the drive assist device 1 is provided with a HUD 4 and a control device 6.

The HUD 4 is a display means which displays the recommended driving operation and is a so-called head-up display (HUD: Head-Up Display), which displays a virtual image 35 in the front side of the driver 3 as shown in FIG. 2. As shown in FIG. 1 and FIG. 2, the HUD 4 causes the driver 3 to visually observe the virtual image 35 by projecting the image to the front windshield 33. Therefore, as shown in FIG. 2, the HUD 4 has a projection device 40 and a projection optical system 42, which are disposed on a dashboard 39 below the front windshield 33. Under control of the control device 6, the projection device 40 makes a projection image of the virtual image 35 incident into the projection optical system 42. The projection optical system 42 is an optical system which projects the projection image of the projection device 40 to the front windshield 33 and is provided with a magnifying/reflecting mirror 43 which magnifies and projects the projection image to a projection surface 37, which is set on the front windshield 33 and has a predetermined size. Note that a reflection-type optical element and a transmission-type optical element can be appropriately used as optical elements which constitute the projection optical system 42. The display method of the virtual image 35 by the HUD 4 is not limited to the projection type to the front windshield 33, but an arbitrary method can be used.

The control device 6 generates an assist image 70 (FIG. 4), which is a projection image serving as a base of the projection image to be projected by the projection device 40, and the control device 6 outputs the assist image 70 to the projection device 40. The control device 6 is provided with an arithmetic control means such as a CPU, MPU, or ASIC, a memory such as a RAM which functions as a work area of the arithmetic control means, and a storage means such as a ROM which stores programs; and the programs include a program for generating the assist image 70 according to the present invention. Note that the control device 6 may be integrally formed with a control circuit, etc. provided in the projection device 40.

The assist image 70 is an image for assisting driving of the driver 3. In order to generate the assist image 70, as shown in FIG. 1, the control device 6 is provided with a passage-planned-point state specifying unit 50, a recommended-driving-operation specifying unit 52, a driving-operation evaluating unit 54 and an assist-image generating unit 56. These units are realized when the above described arithmetic control means executes a program(s). However, the units may be appropriately formed by dedicated hardware circuits.

The passage-planned-point state specifying unit 50 specifies the traffic state of the above described passage-planned point Pt and outputs the traffic state to the recommended-driving-operation specifying unit 52. The traffic state includes an information group capable of specifying the recommended driving operation of a case in which the vehicle 2 travels on the passage-planned point Pt. Specifically, the traffic state includes information such as the road shape (lane and width, road centerline (curvature radius), gradient) of the passage-planned point Pt, a legal speed, the presence/absence of preceding vehicles and obstacles of the present time, etc.

Figure 3:
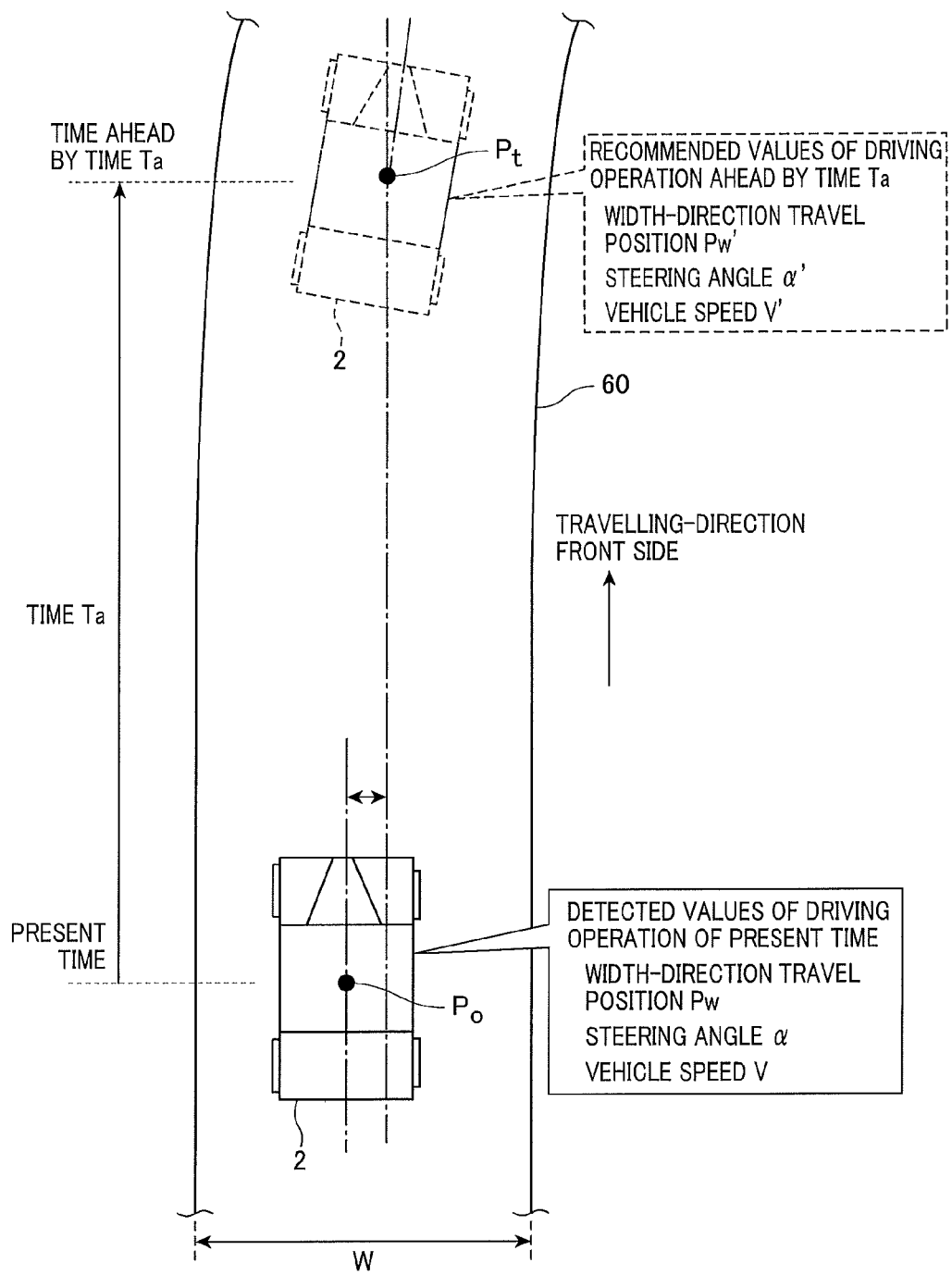
FIG. 3 is an explanatory drawing of a passage-planned point.

FIG. 3 is an explanatory drawing of the passage-planned point Pt.

In the drive assist device 1, as the passage-planned point Pt, a point of the road 60 expected to be passed through by the vehicle 2 after predetermined time Ta is used as shown in FIG. 3. The passage-planned point Pt is obtained based on route information 16 of the route on which the vehicle 2 is travelling, a current position P0 and a vehicle speed V of present time. More specifically, on condition that the vehicle 2 travels to the travelling-direction front side along the road at the vehicle speed of the present time, the travel distance which is traveled by the vehicle 2 during time Ta is obtained, and the location which is distant from the current position P0, which is serving as a starting point, by the travel distance along the road is obtained as the passage-planned point Pt.

The information required for calculating the passage-planned point Pt and the traffic state of the passage-planed point Pt are sequentially input to the passage-planned-point state specifying unit 50 from the navigation device 8, the vehicle controller 10 and the vicinity detecting device 12 through the CAN 9.

Specifically, the route information 16 of the route on which the vehicle 2 is travelling and the current position P0 are sequentially input from the navigation device 8, and the vehicle speed V of the present time is sequentially input from the vehicle controller 10. In addition to that, the road structure and the legal speed of the passage-planned point Pt is sequentially input by the navigation device 8, and the information about obstacles on the road and the preceding vehicle(s) (the distance from the subject vehicle, size, etc.) is sequentially input from the vicinity detecting device 12.

The recommended-driving-operation specifying unit 52 specifies the recommended driving operation based on the traffic state of the passage-planned point Pt and outputs the recommended driving operation to the assist-image generating unit 56. The recommended driving operation is a driving operation which is lead to be harmless to traffic safety based on the traffic state at decision time and is not required to be an optimum driving operation.

In the drive assist device 1, as the recommended driving operation, a steering angle $\alpha'$, a travel position (width-direction travel position) Pw' in a width W (FIG. 3) of the road 60 and a vehicle speed V' of a case of travelling at the passage-planned point Pt are specified. More specifically, based on the traffic state of the passage-planned point Pt, the recommended-driving-operation specifying unit 52 specifies the shape (lane and width, road center line (curvature radius), gradient) of the road 60, the presence/absence of obstacles or preceding vehicles, distance to the obstacles or the preceding vehicles, a legal speed, etc. Then, based on the traffic state of the passage-planned point Pt, the recommended-driving-operation specifying unit 52 predicts an appropriate track and the vehicle speed V' of the case in which the vehicle 2 travels therethrough and specifies the steering angle $\alpha'$ and the width-direction travel position Pw' required for travelling in the track at the vehicle speed V'. The steering angle $\alpha'$ and the width-direction travel position Pw' are output to the assist-image generating unit 56 together with the vehicle speed V' and are reflected to generation of the assist image 70.

The driving-operation evaluating unit 54 evaluates a match degree of the driving operation actually carried out by the driver 3 when the vehicle 2 passes through the passage-planned point Pt and the recommended driving operation, and the driving-operation evaluating unit 54 outputs the match degree to the assist-image generating unit 56. Therefore, the driving-operation evaluating unit 54 is provided with a travel-information acquiring unit 57 and an operation evaluating unit 58. Based on the information of the navigation device 8, the vehicle controller 10 and the vicinity detecting device 12, the travel-information acquiring unit 57 specifies the actual driving operation (steering angle, vehicle speed and width-direction travel position) carried out with respect to the vehicle 2 and outputs the actual driving operation to the operation evaluating unit 58. The operation evaluating unit 58 compares the recommended driving operation and the actual driving operation about the same point, sequentially obtains the match degree of them, and outputs the match degree to the assist-image generating unit 56. According to this match degree, the degree of closeness of carried out driving to the recommended driving operation is sequentially obtained.

The assist-image generating unit 56 generates the assist image 70 based on the output of the passage-planned-point state specifying unit 50, the recommended-driving-operation specifying unit 52 and the driving-operation evaluating unit 54, outputs the assist image 70 to the HUD 4, and is provided with a parts storage unit 61 and a relative-value converting unit 62.

The parts storage unit 61 stores various image elements such as icons, figures, symbols and characters which are to be included in the assist image 70. The relative-value converting unit 62 converts the recommended driving operation to relative values based on the driving operation of the present time, and details of the relative-value conversion will be described later.

The assist-image generating unit 56 generates the assist image 70 while utilizing the various parts of the parts storage unit 61 so that the image includes an image for presenting to the driver 3 with the recommended driving operation that has been relative-value converted, and the assist-image generating unit 56 outputs the recommended driving operation to the HUD 4.

As a result, a projection image based on the assist image 70 is projected to the front windshield 33 by the HUD 4, and the image showing the recommended driving operation is visually observed by the driver 3 as the virtual image 35.

Figure 4:
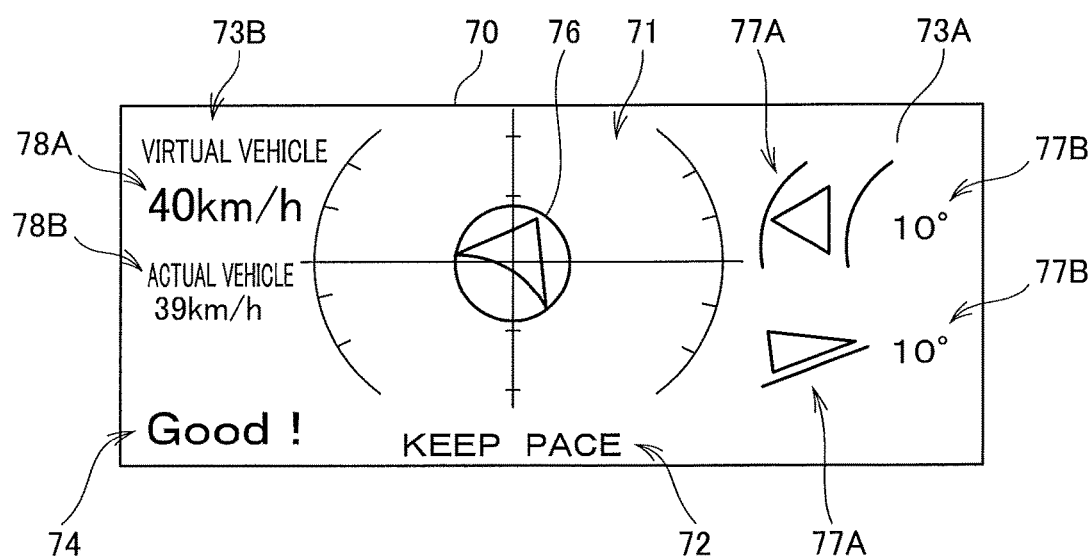
FIG. 4 is a schematic drawing showing an example of an assist image.

FIG. 4 is a schematic drawing showing an example of the assist image 70.

As shown in the drawing, the assist image 70 includes a recommended-driving-operation presenting region 71 at the center thereof and includes a notification-message region 72 in a lower side of the recommended-driving-operation presenting region 71. Moreover, the assist image 70 includes driving-operation-degree notification regions 73A and 73B in left and right both sides of the recommended-driving-operation presenting region 71 and includes an operation-evaluation notification region 74 in a lower side of the left-side driving-operation-degree notification region 73B.

Figure 5:
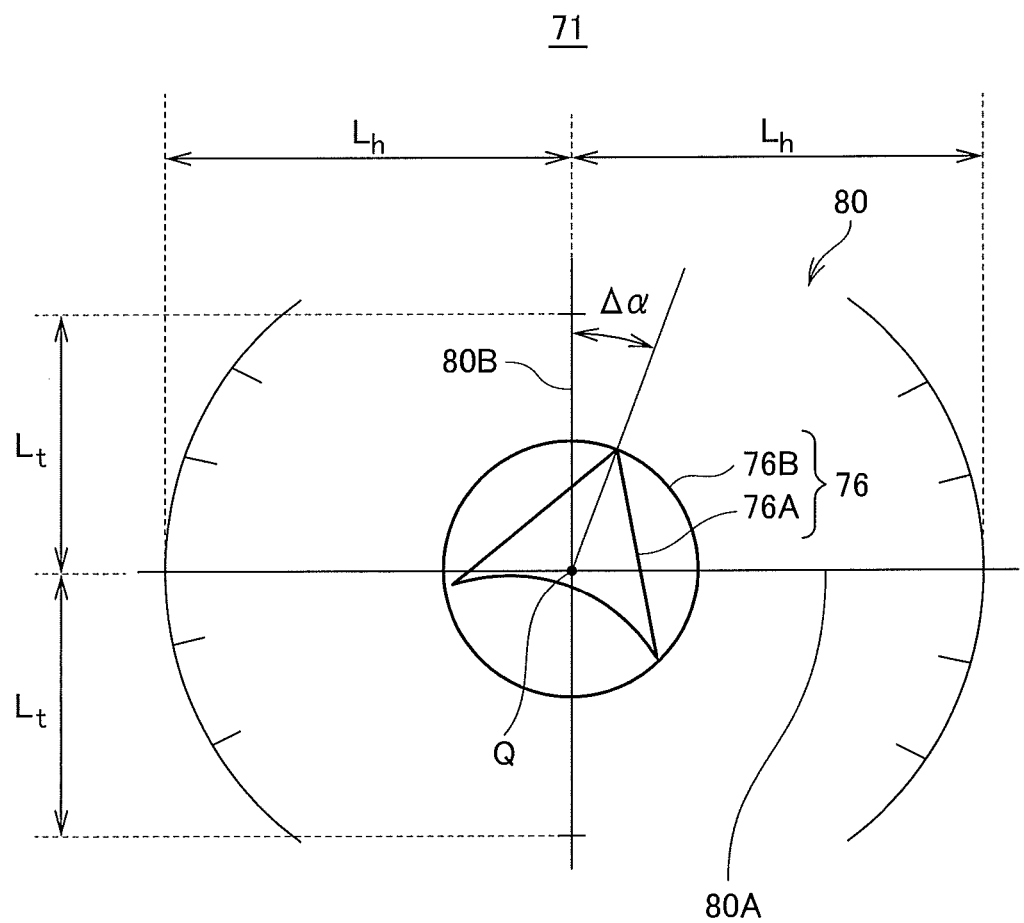
FIG. 5 is an enlarged view of a recommended-driving-operation presenting region.

FIG. 5 is an enlarged view of the recommended-driving-operation presenting region 71.

The recommended-driving-operation presenting region 71 is a region which gives a notification about the recommended driving operation by displaying a vehicle mark 76. The vehicle mark 76 is a drawing including a shape (in the shown example, an approximately triangular shape) capable of clearly showing a travelling direction, and the recommended driving operation recommended at time Ta which is ahead of the present time is presented by the display mode of the vehicle mark 76. Note that the vehicle mark 76 may be appropriately changeable depending on the preference of a user such as the driver 3.

Herein, in the drive assist device 1, the time Ta is set based on a reaction speed of a general person taken from notification of the recommended driving operation by the display until a driving operation is actually carried out. In this time setting, the longer the time taken for recognizing and understanding the display of the recommended driving operation, the more reflection to the driving operation is delayed, and the longer the set time of the time Ta becomes. When the time Ta becomes long, the arrival time (arrival distance) to the passage-planned point Pt is extended; therefore, certainty of the traffic state prediction at the passage-planned point Pt is lowered.

Therefore, in the drive assist device 1, the notification is given by displaying the recommended driving operation so that the driver 3 can intuitively understand the recommended driving operation; therefore, the time Ta can be set to be short time, which is about 2 seconds. Hereinafter, this configuration will be described in detail.

In the recommended-driving-operation presenting region 71, as shown in FIG. 5, a target marker 80 including a horizontal line 80A and a vertical line 80B corresponding to an X-axis and a Y-axis of orthogonal coordinate axes is provided, and a notification of the recommended driving operation ahead by the time Ta is given by changes in a position coordinate of the vehicle mark 76 and the direction directed by the vehicle mark 76 in the target marker 80.

In more detailed description, in the target marker 80, the horizontal line 80A corresponds to a width-direction travel position, the vertical line 80B corresponds to a vehicle speed, and the inclination of the vehicle mark 76 with respect to the vertical line 80B corresponds to a steering angle.

However, in the drive assist device 1, the values (absolute values) of the width-direction travel position Pw', the vehicle speed V' and the steering angle α' at the time Ta ahead are converted to relative values based on the values of the present time and subjected to mapping instead of mapping the absolute values without change in the target marker 80.

The conversion to the relative values is carried out by the above described relative-value converting unit 62.

More specifically, the relative-value converting unit 62 obtains a width-direction-travel-position relative value ΔPw, a steering-angle relative value Δα and a vehicle-speed relative value ΔV by obtaining differences respectively between the width-direction travel position Pw, the steering angle α and the vehicle speed V of the vehicle 2 at the present time and the width-direction travel position Pw', the steering angle α' and the vehicle speed V' recommended at the time Ta ahead.

Then, the relative-value converting unit 62 normalizes the width-direction-travel-position relative value ΔPw by a length Lh (FIG. 5) of the horizontal line 80A, uses the normalized value as a coordinate value of the horizontal line 80A, similarly normalizes the vehicle-speed relative value ΔV by a length Lt (FIG. 5) of the vertical line 80B, and uses the normalized value as a coordinate value of the vertical line 80B.

Then, in the target marker 80 of the recommended-driving-operation presenting region 71, at the position corresponding to these coordinate values, the vehicle mark 76 is displayed in a state in which the vehicle mark 76 is tilted by the steering-angle relative value Δα.

Figure 6:
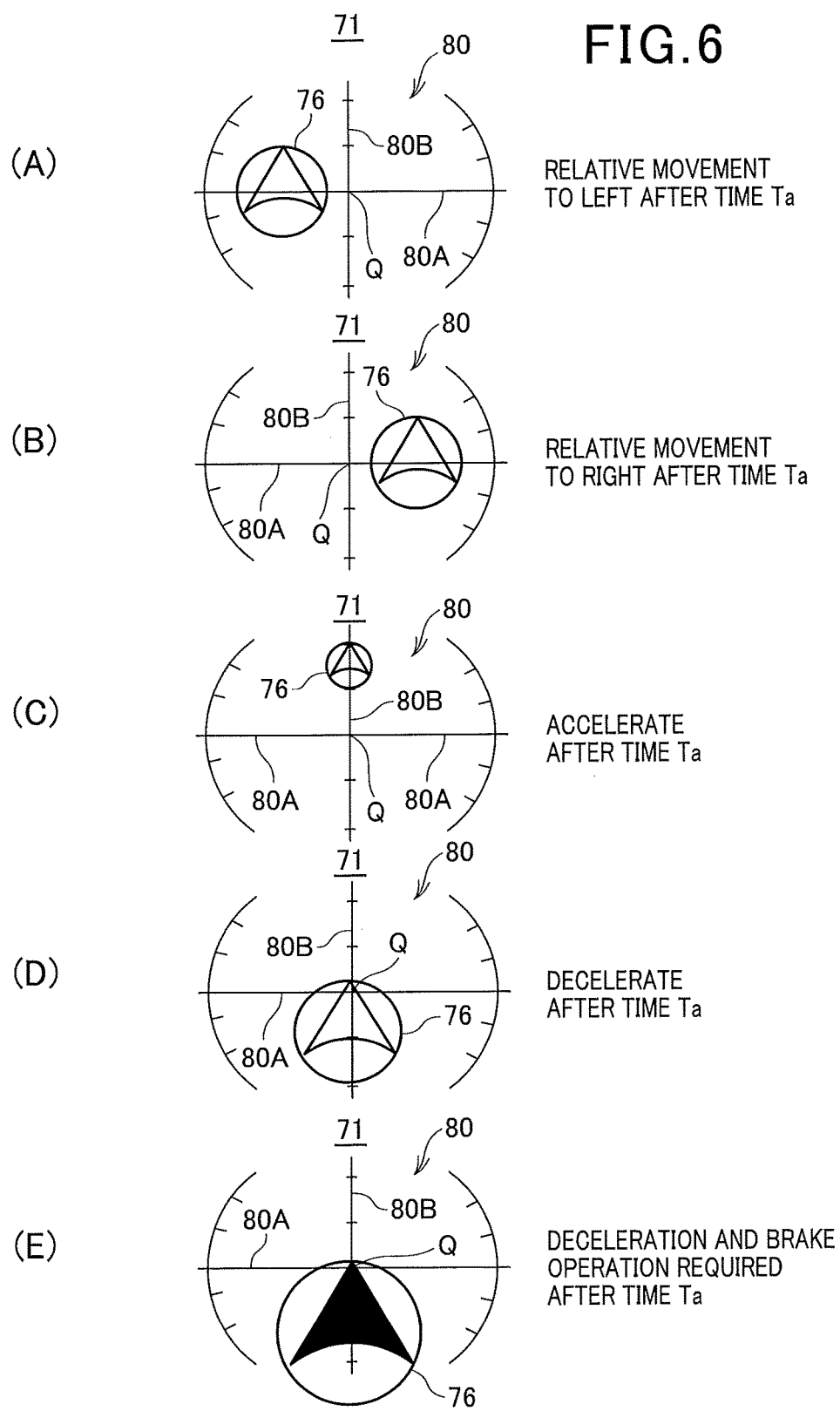
FIG. 6 shows display examples of a vehicle symbol of a target marker.

FIG. 6 shows display examples of the vehicle mark 76 in the target marker 80.

If the driving operation of moving the width-direction travel position to the left or right at the time Ta ahead is recommended, as shown in FIG. 6 (A) and FIG. 6 (B), the vehicle mark 76 is displayed at the position moved along the horizontal line 80A to the direction of the relative movement thereof. The movement amount (the distance from an intersection point Q serving as a reference point) of the vehicle mark 76 is the relative value (width-direction-travel-position relative value ΔPw) of the width-direction travel position Pw' at the time Ta ahead based on the width-direction travel position Pw at the present time as described above.

Therefore, if the width-direction-travel-position relative value ΔPw is approximately zero, the vehicle mark 76 is positioned at the intersection point Q; therefore, it can be easily understood that movement of the vehicle 2 in the width direction is not required. If the vehicle mark 76 is moved in the horizontal direction, based on the direction and the movement amount thereof, it can be easily understood the amount and the direction of movement is required with respect to the present time.

If a driving operation of accelerating or decelerating the vehicle speed at the time Ta ahead is recommended, as shown in FIG. 6 (C) and FIG. 6 (D), the vehicle mark 76 is displayed at the position moved along the vertical line 80B to the direction corresponding to acceleration or deceleration. In the present embodiment, a positive direction (upward direction) of the vertical line 80B shows acceleration, and a negative direction shows deceleration. Therefore, if the vehicle speed V' at the time Ta ahead is faster than that of the present time, as shown in FIG. 6 (C), the vehicle mark 76 is displayed at a position moved in the positive direction of the vertical line 80B. Reversely, if the vehicle speed V' recommended at the time Ta ahead is slower than that of the present time, as shown in FIG. 6 (D), the vehicle mark 76 is displayed at a position moved in the negative direction of the vertical line 80B.

Furthermore, in the drive assist device 1, in order to enable more intuitive understanding of the magnitude of the speed, in addition to the display position of the vehicle mark 76 on the vertical line 80B, the size of the vehicle mark 76 is also variably displayed. More specifically, if the vehicle mark 76 is to be displayed at a position moved in the positive direction of the vertical line 80B, the vehicle mark 76 is downsized depending on the distance from the intersection point Q; and, if the vehicle mark 76 is to be displayed at a position moved in the negative direction, the vehicle mark 76 is enlarged depending on the distance from the intersection point Q, thereby carrying out display that gives the sense of perspective depending on the vehicle-speed relative value ΔV.

As a result of this display, if the vehicle speed V at the present time is slower than the vehicle speed V' at the time Ta ahead, as shown in FIG. 6 (C), the vehicle mark 76 is positioned and shown far in a deep side (far side); therefore, the driver 3 intuitively ideates that acceleration is required. Reversely, for example, if the vehicle speed V at the present time is exceeding the vehicle speed V' at the time Ta ahead, as shown in FIG. 6 (D), the vehicle mark 76 is positioned and shown near a near side; therefore, the driver 3 intuitively ideates that deceleration is required.

Moreover, in the drive assist device 1, if a brake operation is recommended at the time Ta ahead, as shown in FIG. 6 (E), a display color of the vehicle mark 76 is changed and displayed so that the fact that the brake operation is required can be understood at a glance. Instead of the change of the display color of the vehicle mark 76, the notification of the brake operation may be given by an arbitrary display mode such as superimposition of a figure/symbol, etc. meaning the brake operation on the vehicle mark 76 or changing of the display mode to blinking display.

Figure 7:
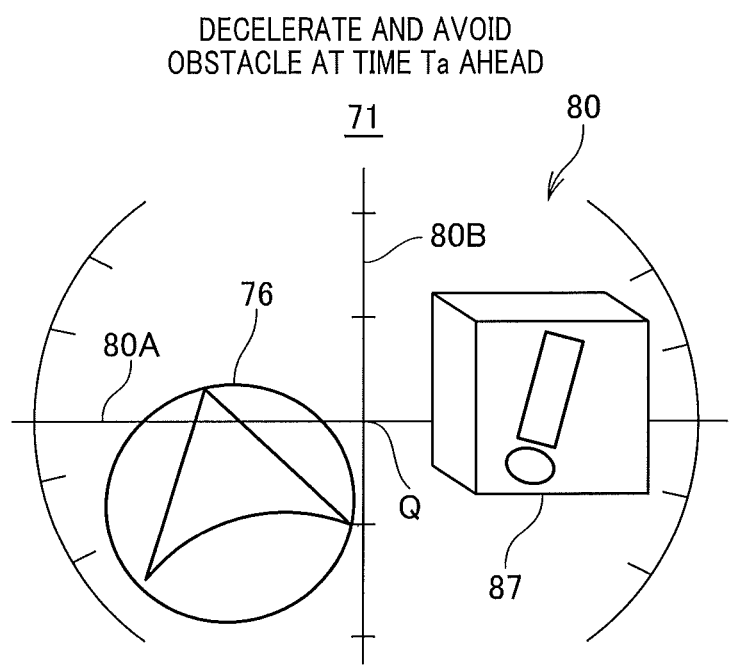
FIG. 7 is a display example of an obstacle in the target marker.

Moreover, in the drive assist device 1, if an obstacle is present at the passage-planned point Pt, as shown in FIG. 7, an obstacle icon 87 representing the obstacle is displayed in the target marker 80 to give a notification of the presence thereof.

The display position of the obstacle icon 87 in the target marker 80 is determined by the relative position of the obstacle based on the current position P0 of the vehicle 2 at the present time. Therefore, in the target marker 80, the vehicle mark 76 is displayed at a position and in a direction that can be shown to avoid the obstacle icon 87, and an avoiding action of the obstacle is easily perceived by the driver 3.

Returning to above described FIG. 4, the notification message region 72 is a region to give notifications by displaying various messages about the recommended driving operation. The drive assist device 1 displays a message about a vehicle-speed operation corresponding to the magnitude of the vehicle-speed relative value ΔV and/or a message corresponding to the traffic state of the passage-planned point Pt.

For example, if the vehicle-speed relative value ΔV is approximately zero, "KEEP PACE" which instructs to maintain the vehicle speed is displayed; if the vehicle-speed relative value ΔV>>0, "SLOW DOWN" which instructs deceleration is displayed; and, if the vehicle-speed relative value ΔV<<0, "SPEED UP" which instructs acceleration is displayed.

For example, if an obstacle is present at the passage-planned point Pt or if the inter-vehicle distance to a preceding vehicle is to be shortened, "CAUTION!" which urges attention or "BREAKING POINT" which instructs a brake operation is displayed.

In this case, depending on the importance degree of the instruction, the message is displayed in an emphasizing mode (for example, the display color, size, etc. are changed).

The driving-operation-degree notification regions 73A and 73B respectively show operation degrees of the recommended driving operation by numerical values. The driving-operation-degree notification region 73A in the right side of the recommended-driving-operation presenting region 71 shows the steering-angle relative value Δα, and the driving-operation-degree notification region 73B in the left side shows the absolute value of the vehicle speed V.

Figure 8:
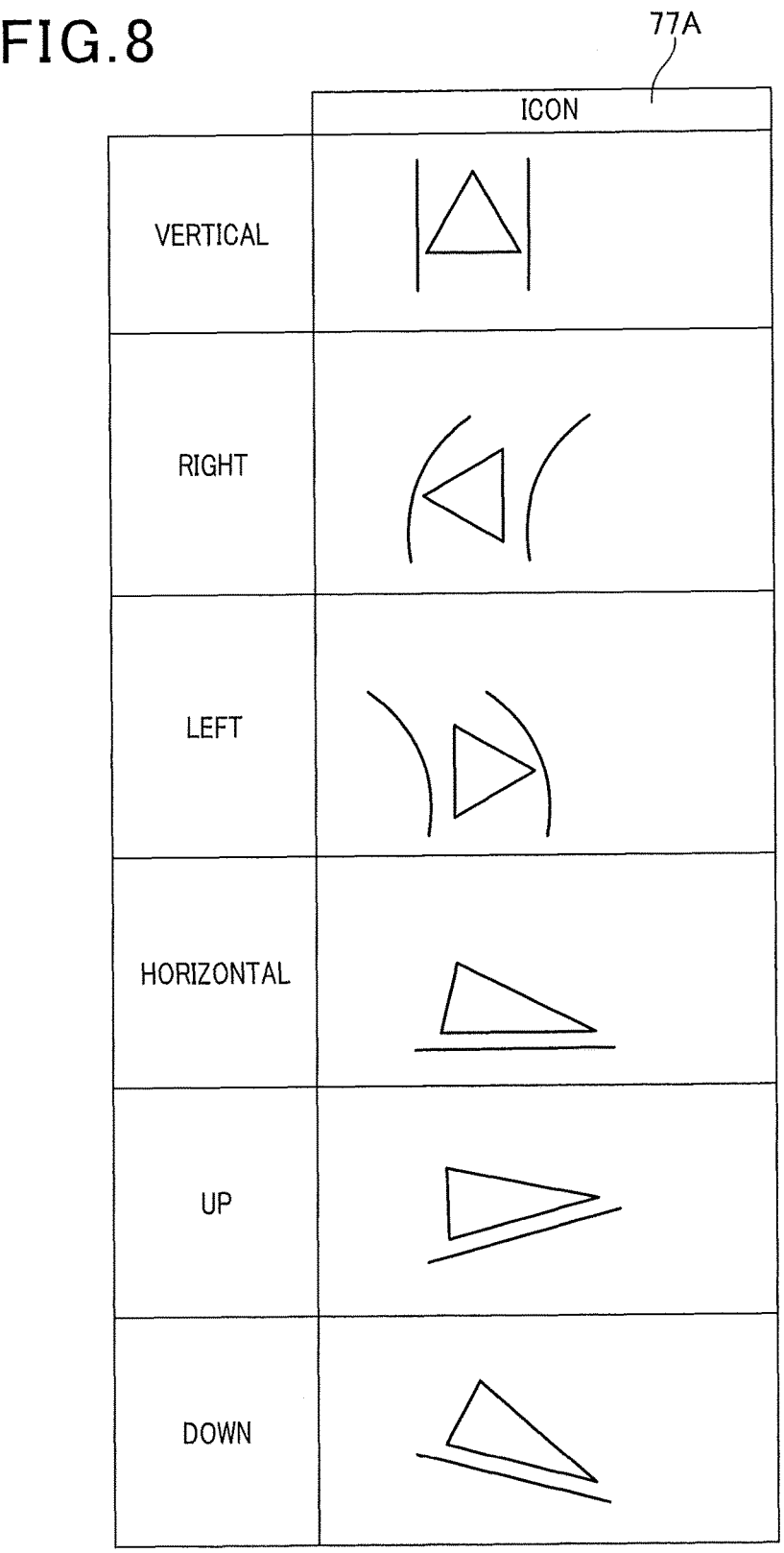
FIG. 8 is an explanatory drawing of icons used in the assist image.

In the driving-operation-degree notification region 73A, the gradient of the passage-planned point Pt is also displayed in combination, and the steering-angle relative value Δα and the gradient are displayed as a set with icons 77A and absolute values 77B. As shown in FIG. 8, as the icon 77A about the steering angle α, respectively for "vertical", "right" and "left" for distinguishing the rotation operation directions of the steering wheel 25, figures for intuitively ideating the rotation operation directions are used. Also for the icon 77A about the gradient, respectively for "horizontal", "UP" and "DOWN" for distinguishing the inclined directions of the road 60, figures for intuitively ideating the inclined directions are used.

Therefore, with the icons 77A, the rotation direction of the steering wheel 25 and the presence/absence of the gradient of the road 60 at the passage-planned point Pt can be understood at a glance, and, by displaying the absolute values 77B near the icons 77A, the specific steering-angle relative value Δα of the steering wheel 25 and the specific gradient of the road 60 can be understood.

Meanwhile, in the driving-operation-degree notification region 73B, an absolute value 78A of the vehicle speed V' at the time Ta ahead and an absolute value 78B of the vehicle speed V at the present time are displayed. As a result, the driver 3 can specifically understand the absolute values 78A and 78B about the deceleration and acceleration operations intuitively perceived by the display of the recommended-driving-operation presenting region 71. Regarding the absolute value 78B of the vehicle speed V at the present time, as well as the notification in the notification-message region 72, the display mode thereof (for example, display color) is changed depending on the vehicle-speed relative value ΔV, and the presence/absence of the necessity of acceleration, deceleration, etc. at the time Ta ahead can be perceived also by the change of the display mode.

The operation-evaluation notification region 74 is a region which gives a notification by displaying a message corresponding to the evaluation by the driving-operation evaluating unit 54.

Specifically, depending on the match degree of the driving operation and the recommended driving operation, a message such as "Good" or "Very Good" is displayed. When the message is displayed, the driver 3 can promptly find out the fact that driving close to the recommended driving operation has been carried out. As a result, a motivation to, for example, increase the match degree with the recommended driving operation can be maintained.

Figure 9:
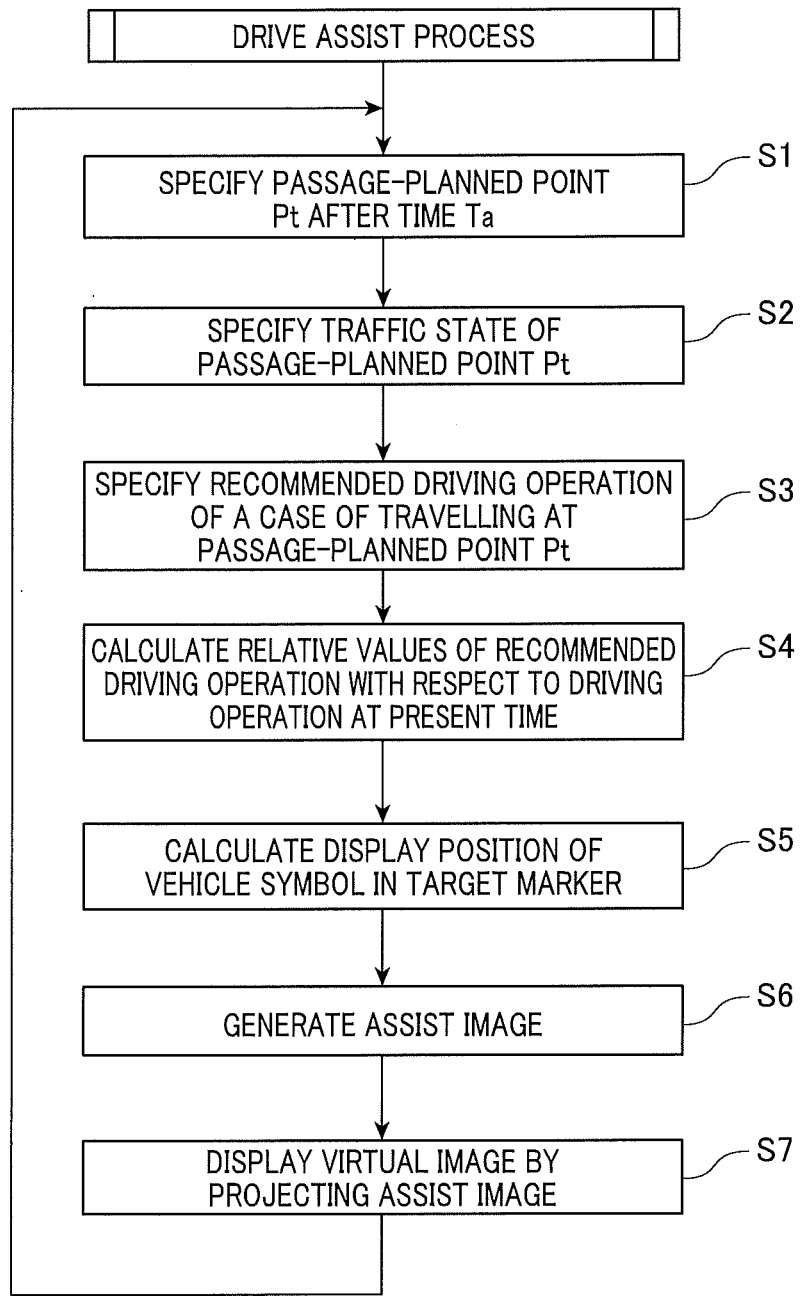
FIG. 9 is a flow chart about a drive assist operation of the drive assist device.

FIG. 9 is a flow chart about a drive assist operation of the drive assist device 1. Note that the operation shown in the drawing is started when a drive assist instruction is given to the drive assist device 1 by, for example, an unshown user operation button and, the operation shown in the drawing is terminated by a termination instruction by, for example, the user operation button.

As shown in the drawing, the control device 6 of the drive assist device 1 sequentially acquires various information from the navigation device 8, the vehicle controller 10 and the vicinity detecting device 12, specifies the passage-planned point Pt at the time Ta ahead of the present time (step S1), and specifies the traffic state of the passage-planned point Pt (step S2). Then, the control device 6 specifies the recommended driving operation of a case of travelling at the passage-planned point Pt based on the traffic state of the passage-planned point Pt (step S3). In the present embodiment, the recommended driving operation includes the width-direction travel position Pw', the steering angle α' and the vehicle speed V' as described above.

Then, the control device 6 obtains the relative values (the width-direction-travel-position relative value ΔPw, the steering-angle relative value Δα and the vehicle-speed relative value ΔV) of the recommended driving operation based on the driving operation (the width-direction travel position Pw, the steering angle α and the vehicle speed V) of the present time by the differences (step S4).

Then, the control device 6 normalizes the width-direction-travel-position relative value ΔPw and the vehicle-speed relative value ΔV relatively by the lengths Lh and Lt of the horizontal line 80A and the vertical line 80B of the target marker 80 and obtains the display position of the vehicle mark 76 in the target marker 80 (step S5). The control device 6 generates the assist image 70, which includes the image of the vehicle mark 76 in a state in which the vehicle mark 76 is tilted by the steering-angle relative value Δα, at the display position in the target marker 80 (step S6) and projects and displays the assist image 70 as the virtual image 35 through the HUD 4 (step S7).

The control device 6 repeatedly executes the processing of these steps S1 to S7, and, as a result, the recommended driving operations at the time Ta ahead are sequentially displayed by the virtual image 35.

Figure 10:
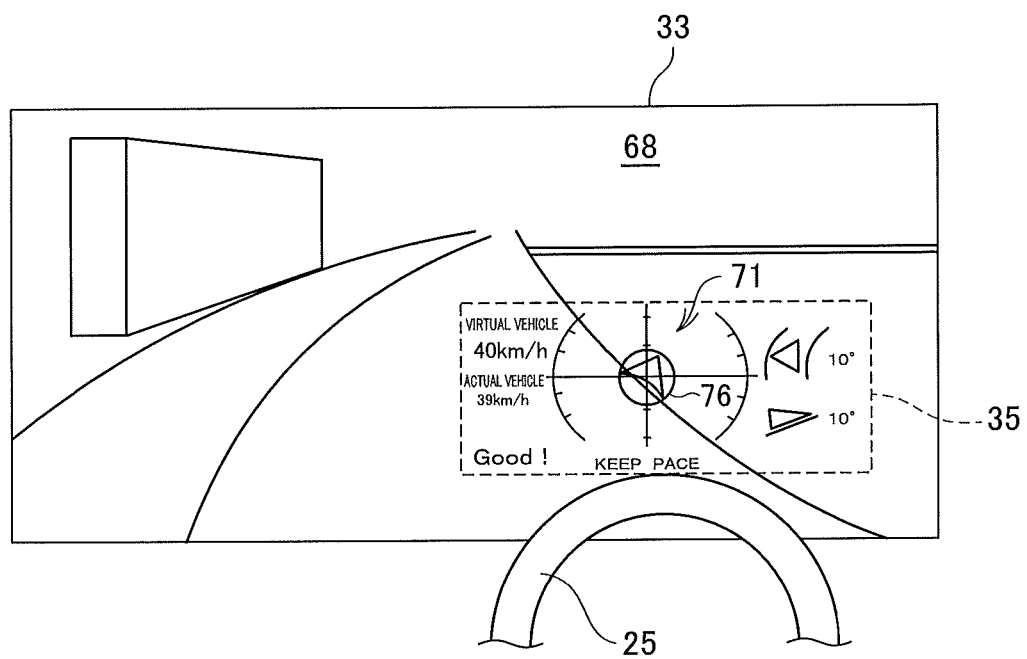
FIG. 10 is a drawing schematically showing an example of a virtual image about drive assistance.

FIG. 10 is a drawing schematically showing an example of the virtual image 35 about drive assist.

As shown in the drawing, when the assist image 70 is projected and displayed by the HUD 4, the virtual image 35 corresponding to the assist image 70 is displayed on the front windshield 33. The virtual image 35 is displayed in the side behind the steering wheel 25 when viewed from a driver's seat, in other words, at a position in the front side of the driver 3 and is semi-transparently displayed to be overlapped with a landscape 68, which is visually observed from the front windshield 33.

In the drive assist device 1, the position and range of displaying the virtual image 35 on the front windshield 33 are always fixed in a front-side position of the driver 3. More specifically, each of the regions 71 to 73A and 73B of the above described assist image 70 is displayed at the front-side positions of the driver 3 by the virtual image 35, and each of the regions 71 to 73A and 73B is always displayed at constant positions in predetermined sizes.

Herein, for example, if a virtual vehicle travelling at a preceding position of the subject vehicle is to be displayed by a virtual image to assist driving, a technique to display the virtual vehicle at an appropriate position (for example, on a road surface in the front side) in the landscape 68, which is visually observed through the front windshield 33, in an appropriate size (for example, a size copying the subject vehicle) is conceivable. In the drive assist device, it is a presupposition of the drive assist to carry out driving so as to follow the virtual vehicle and trace the same track as the virtual vehicle at the same vehicle speed, etc.

However, in the drive assist, since the virtual vehicle is displayed at the position corresponding to the landscape 68, the display position of the virtual vehicle, in other words, an attention range to be focused on by the driver 3 is large, and it is cumbersome to find the virtual vehicle in some cases. Particularly, depending on the landscape 68, contrast with the virtual image is weak, and the virtual vehicle may be visually lost.

In addition, in order to display the virtual vehicle in an appropriate size at an appropriate position in the landscape 68, the landscape 68 has to be recognized with high accuracy, and the subject vehicle has to be mapped in the landscape 68 with high accuracy, wherein extremely complex processing is required. Therefore, it is not easy to map the virtual vehicle, which shows the travel state of the subject vehicle after the short time Ta such as 2 seconds, in the landscape 68.

On the other hand, as described above, the drive assist device 1 is configured so that the recommended-driving-operation presenting region 71 is displayed in a fixed size at a fixed position of the front windshield 33, and the vehicle mark 76 is displayed therein. By virtue of this configuration, even when the contrast between the landscape 68 and the vehicle mark 76 becomes weak, the position at which the vehicle mark 76 is present can be approximately predicted, and visual lost thereof can be therefore prevented. Moreover, since processing of mapping the vehicle mark 76 in the landscape 68 is not required, even if the time Ta is short, the recommended driving operation after the time Ta can be easily presented.

As explained above, the present embodiment is configured to convert the recommended driving operation to be shown to the driver 3 to the relative values based on the driving operation of the present time and to move the vehicle mark 76 by the movement amount corresponding to the relative values to notify the recommended driving operation to the driver 3.

By virtue of this configuration, when driving is to be assisted by displaying the virtual image 35 in front of the driver 3, the notification of only the recommended driving operation which is changed from the present time can be given to the driver 3 by the moved vehicle mark 76, and the driver 3 can easily perceive the operation direction and the operation degree, which are based on the present time, according to the movement direction and the movement amount thereof.

Moreover, according to the present embodiment, the driving operation subjected to notification as the recommended driving operation is always the driving operation at the constant time Ta ahead.

As a result, the driver 3 is always notified of the driving operation to be carried out at the constant time Ta ahead. Therefore, the driver 3 can be prevented from making a mistake on the timing to carry out the notified driving operation.

Particularly, with the drive assist device 1, the driver 3 can intuitively perceive the recommended driving operation without taking time through movement of the vehicle mark 76. Therefore, comparatively short time within the range of the reaction speed of a general person can be set as the time Ta. Since the time Ta is not required to be long in this manner, reliability reduction in a case of predicting the traffic state at the time Ta ahead can be suppressed.

Moreover, even if the time Ta is set at short time, the drive assist device 1 does not require complex processing of mapping the vehicle mark 76 in the actual landscape 68. Therefore, processing can be terminated to reliably complete display within the time Ta.

Moreover, since the driving operation at the certain time Ta ahead is subjected to notification, for example if the vehicle 2 stops for the time Ta or more for example for waiting for a traffic light, the vehicle mark 76 is also displayed to stay at a constant position (precisely, the intersection point Q) without moving, and consistency with the travel state of the vehicle 2 is maintained.

Moreover, the present embodiment is configured to display the absolute value (the vehicle speed V' at the time Ta ahead) of the recommended driving operation and the relative value (the steering-angle relative value Δα) together with the vehicle mark 76.

As a result, the driver 3 can perceive the specific operation degrees of the recommended driving operation. Note that only either one of the absolute value of the recommended driving operation and the relative value may be displayed.

Moreover, the present embodiment is configured to display the horizontal line 80A and the vertical line 80B, which are the coordinate axes including the intersection point Q, and to display the vehicle mark 76 that is moved from the intersection point Q within the coordinate by the coordinate axes by the movement amount corresponding to the above described relative value.

As a result, the driver 3 can easily find out the vehicle mark 76 with a guide by the position of the intersection point Q. Therefore, compared with a case in which a virtual image similar to the vehicle mark 76 is mapped and displayed in the actual landscape 68, visual observation of the vehicle mark 76 becomes easy, and, by virtue of the change of the movement, the direction, operation degree, etc. of the recommended driving operation to be carried out can be easily perceived.

Moreover, the present embodiment is configured to convert the position of the obstacle present in the travel-direction front side to the relative value based on the current position P0 of the vehicle 2 of the present time and display the obstacle icon 87 at the position corresponding to the relative value together with the vehicle mark 76.

As a result, the driver 3 can easily perceive the presence of the obstacle, the vehicle mark 76 is displayed at the position that can be shown to avoid the obstacle icon 87, and the driver 3 can easily perceive the obstacle avoiding action.

Moreover, the present embodiment is configured to give the notification of the vehicle speed V and the width-direction travel position Pw as the recommended driving operation. Therefore, the driver 3 can easily perceive at which vehicle speed and by which track the passage-planned point Pt, which is to be visited at the time Ta ahead, is to be passed through.

Moreover, as the recommended driving operation, the steering-angle relative value Δα, which is the relative value of the steering angle α, is shown by the rotation of the vehicle mark 76. Therefore, in which direction and with how much degree the steering wheel 25 is to be subjected to a rotation operation can be easily perceived.

Particularly, the present embodiment is configured to variably display the size of the vehicle mark 76 depending on the vehicle-speed relative value ΔV, which is the relative value of the vehicle speed V. As a result, deceleration/ acceleration at the time Ta ahead can be more reliably understood intuitively, and it can be quickly reflected to a driving operation.

Moreover, the present embodiment is configured so that the vehicle mark 76 is moved in the vertical direction by the movement amount corresponding to the vehicle-speed relative value ΔV and the mark is moved in the horizontal direction by the movement amount corresponding to the width-direction-travel-position relative value ΔPw to provide display.

As a result, the movement of the vehicle mark 76 in the horizontal direction can cause the driver 3 to intuitively understand that the vehicle 2 is to be moved in the width direction. Moreover, in the vertical-direction movement, the perspective of the vehicle mark 76 is expressed by the synergy with change of the size of the above described vehicle mark 76, and the driver 3 can more reliably understand deceleration/acceleration intuitively.

Moreover, the present embodiment is configured to display the notification message corresponding to the relative value of the recommended driving operation in the display mode (for example, display color) corresponding to the relative value. Therefore, the contents of the recommended driving operation can be more reliably perceived by the driver 3.

Note that the above described embodiment merely exemplifies an embodiment of the present invention. Modifications and applications can be arbitrarily made within the range not departing from the gist of the present invention.

For example, in the above described embodiment, the drive assist device is configured to specify the passage-planned point Pt and the traffic state of the passage-planned point Pt based on the information from another vehicle-mounted devices (the navigation device 8, etc.). However, the various means for specifying the information may be configured to be provided in the drive assist device. Moreover, the drive assist device 1 and the navigation device 8 may be integrated as a drive assist system.

For example, the above described embodiment shows, as an example, the vehicle speed, the width-direction travel position and the steering angle as the driving operation shown to the driver, but is not limited thereto. More specifically, an arbitrary operation(s) about driving such as an indicator operation, an accelerator pedal operation, a headlight lighting operation, a horn operation, etc. may be subjected to notification as long as the arbitrary operation(s) is an operation of the vehicle 2 required for safely travelling through the point predicted to be passed through at the time Ta ahead.

Moreover, for example, the above described embodiment shows, an example, the orthogonal coordinate axes using the horizontal line 80A and the vertical line 80B as the coordinate axes displayed in the target marker 80. However, arbitrary coordinate axes such as polar coordinates may be used as long as the arbitrary coordinate axes are coordinate axes including an origin serving as a reference point.

REFERENCE SIGNS LIST

1 DRIVE ASSIST DEVICE
2 VEHICLE
3 DRIVER
4 HUD (HEAD-UP DISPLAY)
6 CONTROL DEVICE
35 VIRTUAL IMAGE
62 RELATIVE-VALUE CONVERTING UNIT
70 ASSIST IMAGE
71 RECOMMENDED-DRIVING-OPERATION PRESENTING REGION
72 NOTIFICATION-MESSAGE REGION
73A, 73B DRIVING-OPERATION-DEGREE NOTIFICATION REGIONS
76 VEHICLE MARK (PREDETERMINED MARK)
80 TARGET MARKER
80A HORIZONTAL LINE
80B VERTICAL LINE
87 OBSTACLE ICON
Pt PASSAGE-PLANNED POINT
Q INTERSECTION POINT (ORIGIN)
Ta TIME (CERTAIN TIME)
Pw WIDTH-DIRECTION TRAVEL POSITION (DRIVING OPERATION)
Pw' WIDTH-DIRECTION TRAVEL POSITION AT TIME Ta AHEAD (RECOMMENDED DRIVING OPERATION)
V VEHICLE SPEED (DRIVING OPERATION)
V' VEHICLE SPEED AT TIME Ta AHEAD (RECOMMENDED DRIVING OPERATION)
α STEERING ANGLE (DRIVING OPERATION)
α' STEERING ANGLE AT TIME Ta AHEAD (RECOMMENDED DRIVING OPERATION)
ΔPw WIDTH-DIRECTION-TRAVEL-POSITION RELATIVE VALUE (RELATIVE VALUE)
ΔV VEHICLE-SPEED RELATIVE VALUE (RELATIVE VALUE)
Δα STEERING-ANGLE RELATIVE VALUE (RELATIVE VALUE)

The invention claimed is:

1. A drive assist device comprising:
a heads-up display projector that displays a virtual image of a predetermined mark in a vehicle and the drive assist device supports a driver to drive the vehicle by displaying a movement of the predetermined mark,
wherein the predetermined mark indicates a recommended driving operation at a passage-planned point,
the passage-planned point is a point through which the vehicle is planned to pass at a certain time which is ahead of a present time,
the drive assist device further comprises a processor that calculates the passage-planned point based on a vehicle speed at the present time and based on the certain time and converts an amount of the recommended driving operation at the passage-planned point into a relative value by obtaining a difference between the amount of the recommended driving operation and an amount of a driving operation at a present time, and
the heads-up display projector displays the predetermined mark that is moved based on a movement amount depending on the relative value.

2. The drive assist device according to claim 1, wherein, together with the predetermined mark, a value of the recommended driving operation and/or the relative value are displayed.

3. The drive assist device according to claim 1, wherein a coordinate axis including an origin is displayed, and the predetermined mark is moved from the origin by the movement amount depending on the relative value within a coordinate defined by the coordinate axis.

4. The drive assist device according to claim 1, wherein the processor converts a position of an object, which is presented in a traveling-direction front side, to a second relative value based on a position of the vehicle at the present time, and the position of the object is displayed at a position depending on the second relative value based on the position of the vehicle at the present time together with the predetermined mark.

5. The drive assist device according to claim 1, wherein the recommended driving operation and the driving operation at the present time include at least one of a vehicle speed and a width-direction position.

6. The drive assist device according to claim 5, wherein the recommended driving operation and the driving operation at the present time include a steering angle and a relative value of the steering angle is displayed by rotation of the predetermined mark.

7. The drive assist device according to claim 5, wherein a size of the predetermined mark is variably displayed depending on a relative value of the vehicle speed.

8. The drive assist device according to claim 5, wherein the predetermined mark is displayed and is moved in a vertical direction by the movement amount depending on a relative value of the vehicle speed and in a horizontal direction by the movement amount depending on a relative value of the width-direction position.

9. The drive assist device according to claim 1, wherein a message depending on the relative value is displayed by a display mode depending on the relative value.

\* \* \* \* \*